United States Patent [19]
Mahalingaiah et al.

[11] Patent Number: 5,960,467
[45] Date of Patent: Sep. 28, 1999

[54] APPARATUS FOR EFFICIENTLY PROVIDING MEMORY OPERANDS FOR INSTRUCTIONS

[75] Inventors: Rupaka Mahalingaiah; Thang M. Tran, both of Austin, Tex.

[73] Assignee: Advanced Micro Devices, Inc., Sunnyvale, Calif.

[21] Appl. No.: 09/133,340

[22] Filed: Aug. 13, 1998

Related U.S. Application Data

[63] Continuation of application No. 08/633,302, Apr. 17, 1996, Pat. No. 5,835,968.

[51] Int. Cl.⁶ .................................................. G06F 9/30
[52] U.S. Cl. ........................ 711/214; 711/212; 711/213; 711/215
[58] Field of Search ................................... 711/212, 213, 711/214, 215; 395/571

[56] References Cited

U.S. PATENT DOCUMENTS

| | | | |
|---|---|---|---|
| 4,044,338 | 8/1977 | Wolf | 365/49 |
| 4,373,182 | 2/1983 | Schultz et al. | 711/215 |
| 4,409,654 | 10/1983 | Wada et al. | 711/213 |
| 4,453,212 | 6/1984 | Gaither et al. | 711/2 |
| 4,807,115 | 2/1989 | Torng | 395/395 |
| 4,858,105 | 8/1989 | Kuriyama et al. | 395/582 |
| 5,185,871 | 2/1993 | Frey et al. | 395/381 |
| 5,204,953 | 4/1993 | Dixit | 711/220 |
| 5,226,126 | 7/1993 | McFarland et al. | 395/394 |
| 5,226,130 | 7/1993 | Favor et al. | 395/585 |
| 5,233,553 | 8/1993 | Shak et al. | 364/746 |
| 5,274,776 | 12/1993 | Senta | 395/570 |
| 5,345,569 | 9/1994 | Tran | 395/395 |
| 5,408,626 | 4/1995 | Dixit | 711/220 |
| 5,423,013 | 6/1995 | Baum et al. | 711/163 |
| 5,434,987 | 7/1995 | Abramson et al. | 395/567 |
| 5,511,017 | 4/1996 | Cohen et al. | 364/746 |
| 5,517,657 | 5/1996 | Rodgers et al. | 711/169 |

(List continued on next page.)

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel, "Chapter 2: Microprocessor Architecture Overview," pp. 2–1 through 2–4.
Michael Slater, "AMD's K5 Designed to Outrun Pentium," Microprocessor Report, vol. 8, No. 14, Oct. 24, 1994, 7 Pages.
Sebastian Rupley and John Clyman, "P6: The Next Step?," PC Magazine, Sep. 12, 1995, 16 pages.
Tom R. Halfhill, "AMD K6 Takes On Intel P6," BYTE, Jan. 1996, 4 pages.
IBM Technical Disclosure Bulletin, "Dual Load/Store Unit with a Single Port Cache", vol. 38, No. 08, Aug. 1995.

*Primary Examiner*—Eddie P. Chan
*Assistant Examiner*—T. V. Nguyen
*Attorney, Agent, or Firm*—Conley, Rose & Tayon, PC; B. Noel Kivlin; Lawrence J. Merkel

[57] ABSTRACT

An apparatus including address generation units, corresponding reservation stations, and a speculative register file is provided. Decode units provide memory operation information to the corresponding reservation stations while the associated instructions are being decoded. The speculative register file stores speculative register values corresponding to previously decoded instructions. The speculative register values are generated prior to execution of the previously decoded instructions. If the register operands included in the address operands of an instruction are stored in the speculative register file, then the memory operation may be passed through the corresponding reservation station to an address generation unit. The address generation unit generates the data address from the address operands and accesses a data cache while register operands corresponding to the instruction are requested from a register file and reorder buffer.

16 Claims, 8 Drawing Sheets

U.S. PATENT DOCUMENTS

| | | | |
|---|---|---|---|
| 5,519,841 | 5/1996 | Sager et al. | 711/202 |
| 5,524,263 | 6/1996 | Griffth et al. | 395/880.23 |
| 5,546,593 | 8/1996 | Kimura et al. | 395/569 |
| 5,559,975 | 9/1996 | Christie et al. | 395/571 |
| 5,568,630 | 10/1996 | Killian et al. | 395/376 |
| 5,590,297 | 12/1996 | Huck et al. | 711/1 |
| 5,590,352 | 12/1996 | Zuraski, Jr. et al. | 395/800.23 |
| 5,612,911 | 3/1997 | Timko | 364/768 |
| 5,615,530 | 4/1997 | Hesson et al. | 52/745.09 |
| 5,655,139 | 8/1997 | Thomson et al. | 395/800.32 |
| 5,664,137 | 9/1997 | Abramson et al. | 395/372 |

```
            INS1              ESP= FFFFFF00  EBP= FFFFFFF0
    0      POP~P2
            INS2
   ----------------                                    ~90
           PUSH~94
    1     BRANCH~96
           PUSH~98
   ----------------
           PUSH~100
    2      PUSH~102
            INS3
```

FIG. 4A

| | ESP | EBP | ESP Constants | EBP Constants |
|---|---|---|---|---|
| 0 | FFFFFF00 | FFFFFFF0 | 0 4 4 | 0 0 0 |
| 1 | FFFFFF04 | FFFFFFF0 | -4 -4 -8 | 0 0 0 |
| 2 | FFFFFEFC | FFFFFFF0 | -4 -8 -8 | 0 0 0 |
| 3 | FFFFFEF4 | FFFFFFF0 | | |
| . | | | | |

FIG. 4B

| | ESP | EBP | ESP Constants | EBP Constants |
|---|---|---|---|---|
| 0 | FFFFFF00 | FFFFFFF0 | 0 4 4 | 0 0 0 |
| 1 | FFFFFF04 | FFFFFFF0 | -4 -4 -8 | 0 0 0 |
| 2 | FFFFFF00 | FFFFFFF0 | | |
| 3 | . | | | |

FIG. 4C

APPARATUS FOR EFFICIENTLY PROVIDING MEMORY OPERANDS FOR INSTRUCTIONS

This application is a continuation of U.S. patent application Ser. No. 08/633,302, filed Apr. 17, 1996, now U.S. Pat. No. 5,835,968.

BACKGROUND OF THE INVENTION

1. Field of the Invention

This invention relates to the field of microprocessors and, more particularly, to address generation mechanisms within microprocessors.

2. Description of the Relevant Art

Superscalar microprocessors achieve high performance by simultaneously executing multiple instructions during a clock cycle and by specifying the shortest possible clock cycle consistent with the design. As used herein, the term "clock cycle" refers to an interval of time during which the pipeline stages of a microprocessor perform their intended functions. Storage devices (e.g. registers or arrays) capture their values in response to a clock signal defining the clock cycle. For example, storage devices may capture a value in response to a rising or falling edge of the clock signal.

Microprocessor designers often design their products in accordance with the x86 microprocessor architecture in order to take advantage of its widespread acceptance in the computer industry. Because the x86 microprocessor architecture is pervasive, many computer programs are written in accordance with the architecture. X86 compatible microprocessors may execute these computer programs, thereby becoming more attractive to computer system designers who desire x86-capable computer systems. Such computer systems are often well received within the industry due to the wide range of available computer programs.

The x86 microprocessor architecture includes an address translation mechanism. Address translation involves the mapping of an address created by the microprocessor to an address actually used to access memory. Generally speaking, an address is a value which uniquely identifies a byte within memory. One or more bytes contiguous to the identified byte may be accessed by presenting to the memory both an address and a number of bytes to access.

Address translation mechanisms are employed for many reasons. For example, the address translation mechanism may be used to define certain microprocessor-created addresses as not presently stored within the main memory. Data corresponding to addresses which are not stored within main memory may be stored on a disk drive within the computer system. When such an address is accessed, the corresponding data may be swapped with data currently stored in main memory. The address translation for the data swapped onto the disk drive is invalidated and an address translation is defined for the data swapped into memory. In this manner, the computer program may access an address space larger than the main memory can support. Additionally, address translation mechanisms are used to protect the data used by one program from access and modification by another program executing within the same computer system. Different areas of main memory are allocated to each program, and the translations for each program are constrained such that any address created by one program does not translate to a memory location allocated to another program. Many other reasons for employing address translation mechanisms are well known.

The x86 address translation mechanism includes two levels. A first level, referred to as segmentation, takes a logical address generated according to instruction operands and produces a linear address. The second level, referred to as paging, translates the linear address to a physical address (i.e. the address actually used to access memory). The linear address is equal to the physical address in cases where the paging mechanism is disabled.

For a particular data access to memory, the logical address comprises the result of adding certain operands defined by the instruction. As used herein, the term "operand" refers to an input value operated upon by an instruction. Operands are referred to as register operands if the value is stored in a register within the microprocessor. Conversely, operands are referred to as memory operands if the value is stored in a memory location. The memory location is identified by forming a data address. In the x86 microprocessor architecture, an instruction may form the logical data address of a memory operand using up to two register operands and up to one displacement. The displacement is a value encoded into a particular field of the instruction, and is intended for use in forming the logical data address. The register operands used to form the logical data address are also referred to herein as register operands. Additionally, instruction operands used to form a data address (e.g. register operands and displacements, as well as segment base addresses as discussed below) are referred to as address operands herein.

Upon generating the logical address, the linear address may be generated. A set of segment registers and associated "shadow registers" store segmentation translation information. The segment selectors are accessible via instructions, while the shadow registers are accessible only to microprocessor hardware. As used herein, the term "segment registers" will be used to refer to the segment registers and associated shadow registers. Each instruction accesses a particular segment register by default when forming linear addresses. Additionally, an instruction may specify a segment register other than the default via an instruction prefix defined in the x86 microprocessor architecture.

Generally speaking, segmentation translation information includes a segment base address, a segment limit, and segment access information. The segment base address is the linear address defined for a logical address having the arithmetic value of zero. Linear addresses within the segment have an arithmetic value which is greater than or equal to the segment base address. The segment limit defines the largest logical address which is within the segment. Logical addresses larger than the segment limit result in an exception being generated by the microprocessor. The segment access information indicates if the segment is present in memory, the type of segment (i.e. instruction code or data, and various subtypes), the addressing mode of the segment, etc. The linear address corresponding to a particular logical address is the result of adding the segment base address to the logical address. Additional information regarding the x86 address translation mechanism may be found in the publication: "PC Magazine Programmer's Technical Reference: The Processor and Coprocessor" by Hummel, Ziff-Davis Press, Emeryville, Calif., 1992 (pp 85–105). This publication is incorporated herein by reference in its entirety.

As used herein, the term "exception" refers to an interruption in the execution of an instruction code sequence. The exception is typically reported to a centralized handling mechanism which determines an appropriate response to the exception. Some exceptions (such as branch misprediction, for example) may be handled by the microprocessor hardware. The hardware performs corrective actions and then restarts instruction execution. Other exceptions may cause a microcode routine within the microprocessor to be executed. The microcode routine corrects the problem corresponding to the exception. Instruction execution may subsequently be restarted at the instruction causing the exception or at another instruction subsequent to the instruction, dependent upon the corrective actions taken. A third type of exception causes execution of special instruction code stored at an address defined for the exception. The special instruction code determines the reason for the exception and any corrective actions. The third type of exception is architecturally defined, such that software may be written to handle the exception. Upon execution of a particular instruction (a return instruction), instruction execution is typically restarted at the instruction which causes the exception. Segment limit violations are an example of the third type of exception. Selection of which method to handle a particular exception with in a microprocessor is dependent upon the relative frequency at which the exception occurs, and the associated performance impact of handling the exception in the various different manners.

Unfortunately, the generation of a logical address involving up to three operands followed by generation of a linear address from the logical address leads to significant latency in data accesses. Because the logical address may depend upon registers, it is typically not generated until the associated instruction arrives in a functional unit (i.e. the execute stage of the microprocessor's instruction processing pipeline). Generating the logical address typically requires one to two clock cycles (depending upon the number of operands and the configuration of the microprocessor), followed by a linear address generation requiring yet another clock cycle. Subsequent to generating the linear address, a paging translation delay may be incurred if paging is enabled. Alternatively, the data cache may be linearly addressed, thereby bypassing the paging delay. Finally, the data cache access time is endured as yet another delay. The aforementioned delays result in delays in receiving the accessed data. Instructions dependent upon the accessed data are thereby delayed from executing as well. Conversely, instructions having register operands may receive the register operands during a clock cycle and execute during a second clock cycle. A mechanism for speeding access to memory operands is therefore desired.

SUMMARY OF THE INVENTION

The problems outlined above are in large part solved by an apparatus in accordance with the present invention. The apparatus includes address generation units and corresponding reservation stations. Decode units provide memory operation information to the corresponding reservation stations while the associated instructions are being decoded. A speculative register file stores speculative register values corresponding to previously decoded instructions. The speculative register values are generated prior to execution of the previously decoded instructions. If the register operands included in the address operands of an instruction are stored in the speculative register file, then the memory operation may be passed through the corresponding reservation station to an address generation unit. The address generation unit generates the data address from the address operands and accesses a data cache while register operands corresponding to the instruction are requested from a register file and reorder buffer. Advantageously, memory operands of the instruction may be provided concurrently with the register operands. Performance of the microprocessor may be increased, particularly in microprocessors have relatively few registers for storing instruction operands. Such microprocessors frequently operate upon memory operands.

For microprocessor employing the x86 microprocessor architecture, data address generation is quite complex. By performing address generation in the address generation units, functional units which execute other instruction operations may be simplified. In cases where fewer address generation units than functional units are included, occupied silicon area may be decreased. Additionally, the design of the functional units is eased.

Broadly speaking, the present invention contemplates an apparatus for accessing memory operands in a microprocessor, comprising first and second address generation units, first and second reservation stations, and a data cache. The first address generation unit is coupled to receive a first plurality of address operands corresponding to a first instruction. The first address generation unit is configured to add the first plurality of address operands to form a first address of a first memory operand corresponding to the first instruction. Similarly, the second address generation unit is coupled to receive a second plurality of address operands corresponding to a second instruction, and is configured to add the second plurality of address operands to form a second address of a second memory operand corresponding to the second instruction. Coupled to the first address generation unit and the second address generation unit, the data cache is configured to store a plurality of cache lines of data and is configured to receive the first address from the first address generation unit and the second address from the second address generation unit. Additionally, the data cache is configured to provide at least one data byte corresponding to the first data address and at least one data byte corresponding to the second data address. The first and second reservation stations are respectively coupled to the first and second address generation units. Each reservation station is configured to store certain ones of the first plurality of address operands until certain other ones of the first plurality of address operands are provided via execution of another instruction.

The present invention further contemplates a method for accessing memory operands in a microprocessor, comprising several steps. A plurality of address operands are generated upon decode of an instruction. The plurality of address operands includes a register operand, which is speculatively generated prior to execution of a second instruction which produces the register operand. The address operands are added in one of a plurality of address generation units, thereby producing an address corresponding to a memory operand of the instruction. A data cache is accessed with the address, whereby the data cache produces data corresponding to the address. The data produced is provided to a reservation station storing the instruction.

The present invention still further contemplates a microprocessor. The microprocessor includes a plurality of address generation units, a data cache, a first plurality of reservation stations, and a plurality of decode units. The address generation units are each coupled to receive a plurality of address operands specifying an address of a memory operand of one of a plurality of instructions. Additionally, each the address generation units is configured to add the plurality of address operands to form the address. Coupled to the address generation units, the data cache is configured to store a plurality of cache lines of data. The data cache is coupled to receive a plurality of the addresses from the plurality of address generation units, and is configured to provide at least one data byte corresponding to at least one of the plurality of addresses. The first plurality of reservation station are coupled to respective address generation units. Each of the reservation stations is configured to store certain ones of the plurality of address operands corresponding to a respective one of the plurality of instructions until certain other ones of the plurality of address operands are provided via execution of another instruction. The plurality of decode units are coupled to respective reservation stations. Each of the decode units is configured to detect the plurality of address operands corresponding to the respective one of the plurality of instructions and to convey the plurality of address operands to the respective reservation station.

BRIEF DESCRIPTION OF THE DRAWINGS

Other objects and advantages of the invention will become apparent upon reading the following detailed description and upon reference to the accompanying drawings in which:

FIGS. 4A, 4B, and 4C depict an exemplary instruction sequence and corresponding values stored in the speculative register file shown in FIG. 4.

Figure 1:
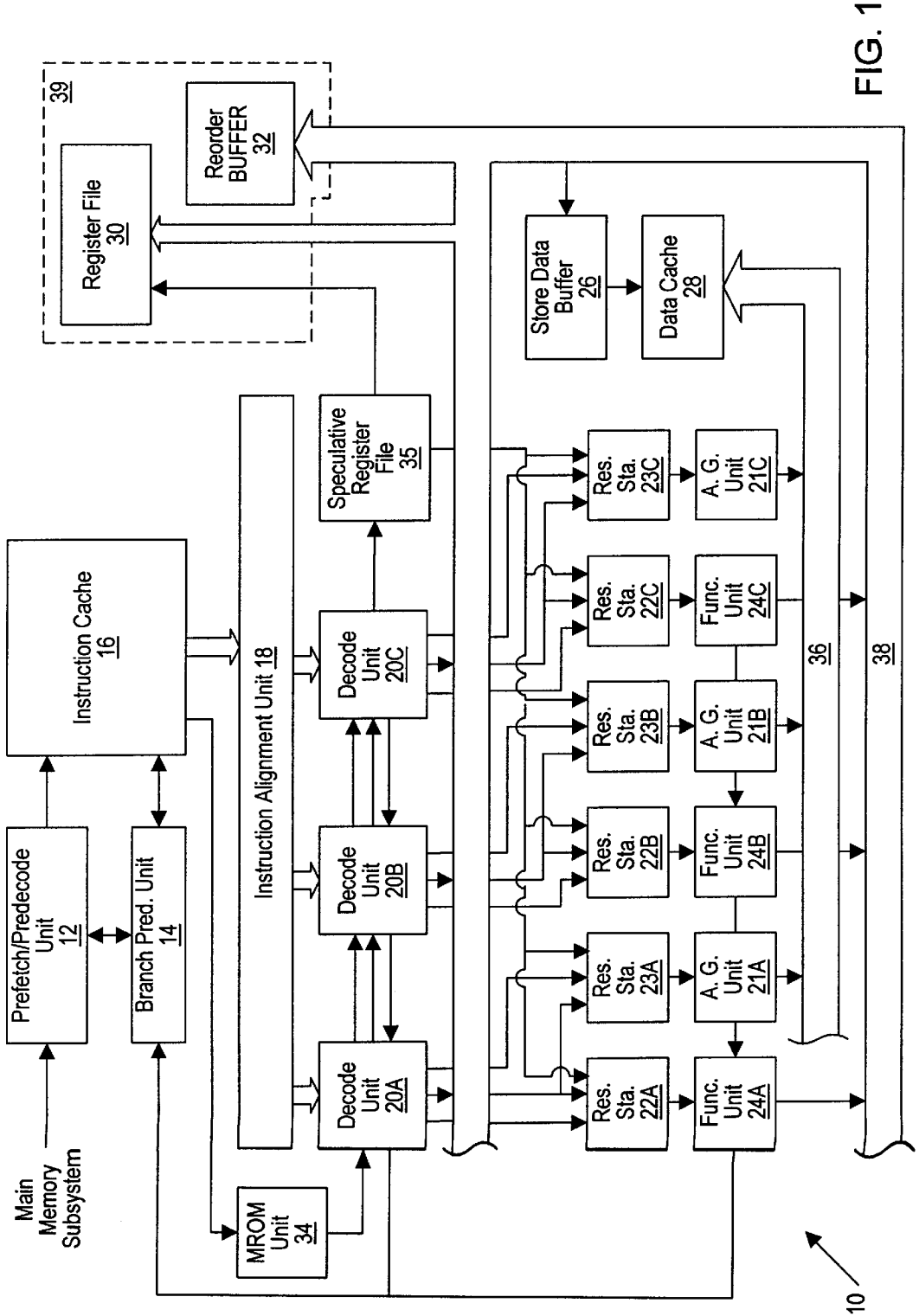
FIG. 1 is a block diagram of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of address generation units 21A–21C, a first plurality of reservation stations 23A–23C, a second plurality of reservation stations 22A–22C, a plurality of functional units 24A–24C, a store data buffer 26, a data cache 28, a register file 30, a reorder buffer 32, an MROM unit 34, and a speculative register file 35. Blocks referred to herein with a reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to a respective first reservation station 23A–23C and a respective second reservation station 22A–22C. Additionally, decode units 20 are coupled to speculative register file 35. Second reservation stations 22A–22C are coupled to respective functional units 24A–24C. Additionally, decode units 20, first reservation stations 23, and second reservation stations 22 are coupled to register file 30 and reorder buffer 32. Speculative register file 35 is coupled to first reservation stations 23 and second reservation stations 22. Functional units 24 are coupled to store data buffer 26, register file 30, and reorder buffer 32 as well. Data cache 28 is coupled to store data buffer 26, address generation units 21, and to the main memory subsystem. Address generation units 21 are coupled to respective first reservation stations 23 and to store data buffer 26. Furthermore, address generation units 21 are coupled to data cache 28 via a plurality of data cache access buses 36. Finally, MROM unit 34 is coupled to decode units 20.

Generally speaking, microprocessor 10 employs address generation units 21 and first reservation stations 23 to perform memory operations corresponding to instructions being executed. A decode unit 20A–20C provides the displacement, an indication of the register operands including in the address operands of the instruction, an indication of the selected segment corresponding to an instruction, and information regarding the load/store nature of the memory operation and the number of bytes to be accessed to a first reservation station 23A–23C. The displacement, selected segment, the load/store nature of the request, the number of bytes to be accessed, and the register operands used to form the data address will be referred to below as memory operation information, for brevity. If the register operands used to form the data address are stored in speculative register file 35, the first reservation station 23A–23C immediately provides the memory operation information to the corresponding address generation unit 21A–21C. If the register operands used to form the data address are not stored in speculative register file 35, then first reservation station 23A–23C stores the provided memory operation information until the register operands used to form the data address are provided. Upon receipt of the remaining register operands, first reservation station 23A–23C conveys the memory operation to address generation unit 21A–21C. Advantageously, address generation is performed by first reservation stations 23A–23C and address generation units 21A–21C. Address generation may begin while the instruction is being decoded, thereby decreasing the data access latency for the operation as compared to address generation mechanisms which begin at instruction execution. Still further, functional units 24 need not contain circuitry for performing address generation. Functional unit complexity may thereby be reduced.

Additionally, address generation units 21 are configured to merge the linear and logical address calculations. Address generation units 21 receive the segment base addresses corresponding to each segment register. Address generation units 21 select one of the segment base addresses dependent upon the default segment register corresponding to the instruction being decoded, as well as dependent upon any overriding specification via a prefix byte within the instruction. Address generation units 21 add the selected segment base address to the other address operands. The linear address is thereby successfully created. Advantageously, the clock cycle previously devoted to generating the linear address from the logical address is eliminated. Instead, the segment base address is added into the address operands while the corresponding instruction is decoded.

Speculative register file 35 is provided for generating and storing register values prior to execution of the instructions which generate those register values. Certain registers (for example, the ESP and EBP registers in the x86 microprocessor architecture) are modified by a constant value in response to executing certain instructions. The ESP, for example, is incremented by two or four (dependent upon operand size) upon execution of a POP instruction. Additionally, the ESP is decremented by two or four upon execution of a PUSH instruction. Other instructions may modify the ESP and EBP registers by a constant value as well.

Decode units 20 detect instructions which modify the ESP and EBP registers by a constant value. The amount by which the instruction modifies the register value is calculated and passed to speculative register file 35 and decode units 20B–20C. Decode units 20B–20C similarly generate constants. Speculative register file 35 stores values indicative of the ESP and EBP register contents subsequent to the execution of each set of concurrently decoded instructions. As a set of instructions are decoded by decode units 20 during a particular clock cycle, the ESP and EBP values corresponding to each instruction within the set of instructions are provided by speculative register file 35. Additionally, the constant values provided to speculative register file 35 may be added to the ESP and EBP values provided by speculative register file 35 to generate new values for a subsequent set of concurrently decoded instructions. The ESP and EBP values used by a particular instruction may thereby be provided while the instruction is decoded. Advantageously, a data address generated from displacement, segment base address, and ESP or EBP values may be generated while the instruction is being decoded. It is noted that a pair of constants are generated by each decode unit 20: one constant for the ESP register and the other for the EBP register.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in an 8 way set associative structure having 16 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to instruction cache 16 recording a miss for the instructions in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing the x86 instruction set will next be described. If a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an SIB byte would have start, end, and functional bits as follows:

| | |
|---|---|
| Start bits | 10000 |
| End bits | 00001 |
| Functional bits | 11000 |

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to second reservation stations 22 along with operand address information and immediate data which may be included with the instruction. The set of control values generated by decode units 20 in response to a particular instruction comprise the "decoded instruction" corresponding to the particular instruction. Decode units 20 route displacement data from the instruction to the respective first reservation station 23, along with an indication of the selected segment register corresponding to the instruction. Additionally, information regarding the memory operand size (in bytes) and load/store nature of the memory operand is conveyed to the respective first reservation station 23.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction which involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate data provided at the outputs of decode units 20 are routed directly to respective second reservation stations 22. In one embodiment, each second reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each second reservation station 22 is associated with a dedicated functional unit 24. Accordingly, three dedicated "issue positions" are formed by second reservation stations 22 and functional units 24. In other words, issue position 0 is formed by second reservation station 22A and functional unit 24A. Instructions aligned and dispatched to second reservation station 22A are executed by functional unit 24A. Similarly, issue position 1 is formed by second reservation station 22B and functional unit 24B; and issue position 2 is formed by second reservation station 22C and functional unit 24C.

Upon decode of a particular instruction, if a required operand is a register location, register address information is routed to reorder buffer 32 and register file 30 simultaneously. Reorder buffer 32 and register file 30 are searched for the corresponding register operands. Reorder buffer 32 and register file 30 may be classified as a "register operand storage", indicated by dashed enclosure 39. Register operands are requested from the register operand storage, and the register operands or a reorder buffer tag identifying the register operand for retrieval from result buses 38 are conveyed from the register operand storage. Although shown as register file 30 and reorder buffer 32 in the present embodiment, register operand storage 39 may comprise any storage from which register operands are provided. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding second reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the second reservation station via data cache 28.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, second reservation stations 22 store instructions until the instructions are executed by the corresponding functional unit 24. An instruction is selected for execution if: (i) the operands of the instruction have been provided; and (ii) the operands have not yet been provided for instructions which are within the same second reservation station 22A–22C and which are prior to the instruction in program order. It is noted that when an instruction is executed by one of the functional units 24, the result of that instruction is passed directly to any second reservation stations 22 and first reservation stations 23 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Second reservation stations 22 route the forwarded result to the functional unit 24 in this case. Additionally, the result may be intended to be stored in memory. Functional units 24 forward the result to store data buffer 26, along with an indication that store data is being forwarded. Store data buffer 26 captures the data and the corresponding reorder buffer tag when the indication is asserted.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated such that any of decode units 20 may dispatch instructions to the floating point unit.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in store data buffer 26 and reorder buffer 32.

Results produced by functional units 24 are sent to reorder buffer 32 if a register value is being updated, and to store data buffer 26 if the contents of a memory location are changed. If the result is to be stored in a register, reorder buffer 32 stores the result in the location reserved for the value of the register when the instruction was decoded. A plurality of result buses 38 (one for each functional unit 24 and two for load/store unit 26) are included for conveying such results to various destinations. Result buses 38 convey the result generated, as well as the reorder buffer tag identifying the instruction being executed. Additionally, an indication that a result is to be stored in memory is conveyed (such that store data buffer 26 may receive the result and corresponding reorder buffer tag).

First reservation stations 23 and address generation units 21 provide an interface between functional units 24 and data cache 28. Decode units 20 convey memory operation information to a respective first reservation station 23A–23C. When the respective reservation station 23A–23C is full, a decode unit must wait until the first reservation station 23A–23C has room for the pending load or store request information. Address generation units 21 subsequently calculate the data address of the memory operation and access data cache 28. First reservation stations 23 also perform dependency checking for load memory operations against pending store memory operations to ensure that data coherency is maintained. A dependency exists between a load memory operation and a store memory operation if the store memory operation is prior to the load memory operation in program order and the store memory operation updates one or more bytes which are accessed by the load memory operation. A memory operation is a transfer of data between microprocessor 10 and the main memory subsystem. Memory operations may be the result of an instruction which utilizes an operand stored in memory, or may be the result of a load/store instruction which causes the data transfer but no other operation. A load memory operation is a transfer of data from memory to microprocessor 10. A store memory operation is a transfer of data from microprocessor 10 to memory. Either memory operation may be completed via an access to data cache 28.

In one embodiment, first reservation stations 23 and address generation units 21 are configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way.

Data cache 28 is a high speed cache memory provided to temporarily store cache lines of data being transferred between load/store unit 26 and the main memory subsystem. In one embodiment, data cache 28 has a capacity of storing up to sixteen kilobytes of data in an eight way set associative structure having 32 byte cache lines. A cache line stores a plurality of bytes (for example, 32 bytes) which are stored in contiguous memory locations. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the segment base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

It is noted that, although an equal number of address generation units 21 and functional units 24 are shown in FIG. 1, other embodiments of microprocessor 10 may include unequal numbers of address generation units 21 and functional units 24. For example, an embodiment of microprocessor 10 may include a single address generation unit 21. The address generation unit 21 would receive information regarding memory operations from each decode unit 20. As another example, an address generation unit 21 may be included for every two functional units 24. Each address generation unit 21 would then be responsible for address generation for instructions executed by the corresponding two functional units. Still further, address generation units may be included which are not specifically associated with any functional units. Instead, the address generation units receive address generation requests from any decode unit, based upon available resources.

Figure 2:
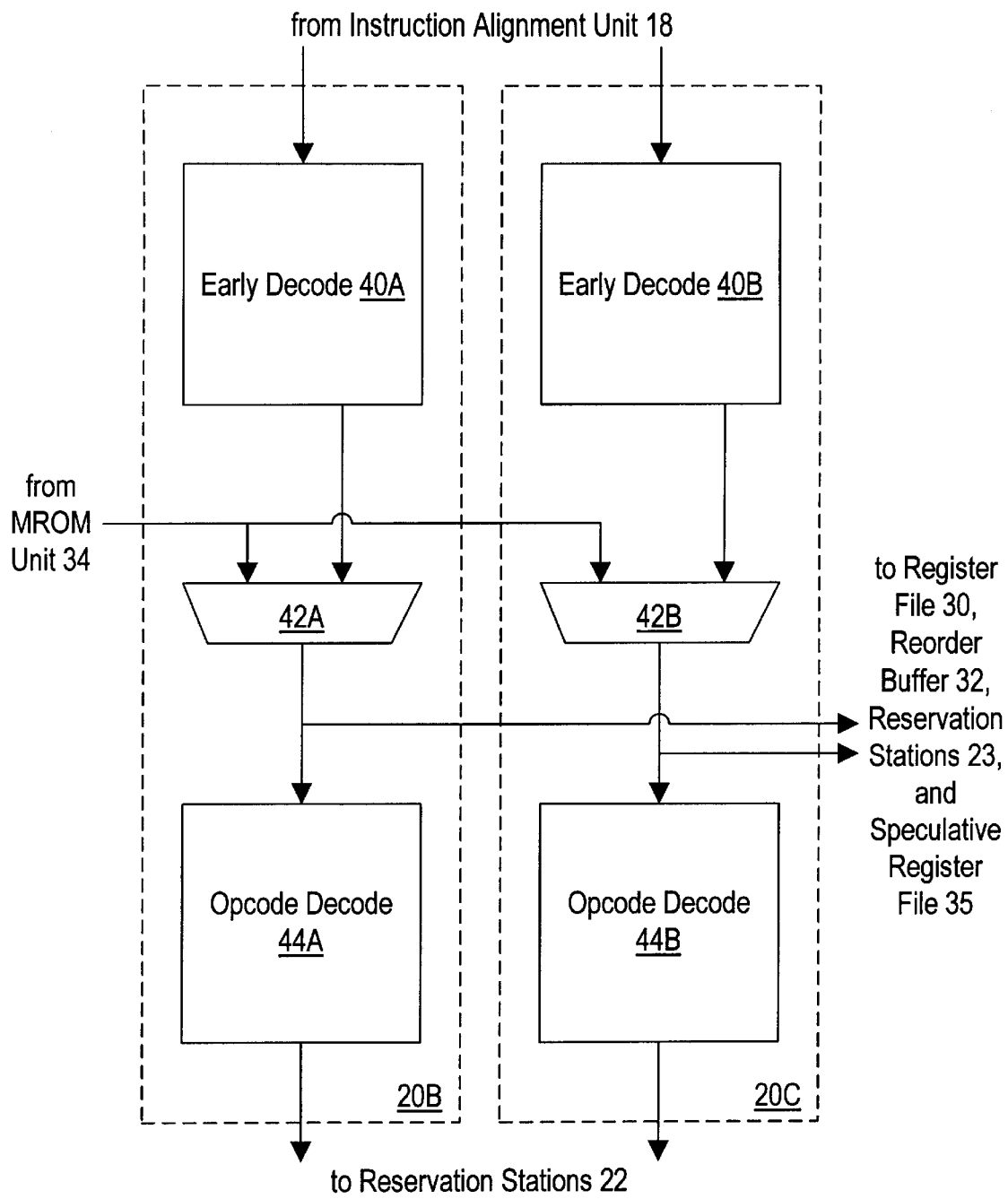
FIG. 2 is a block diagram of one embodiment of a pair of decode units shown in FIG. 1.

Turning now to FIG. 2, a block diagram of one embodiment of decode units 20A and 20B are shown. Each decode unit 20 receives an instruction from instruction alignment unit 18. Additionally, MROM unit 34 is coupled to each decode unit 20 for dispatching fast path instructions corresponding to a particular MROM instruction. Decode unit 20A comprises early decode unit 40A, multiplexor 42A, and opcode decode unit 44A. Similarly, decode unit 20B includes early decode unit 40B, multiplexor 42B, and opcode decode unit 44B.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective second reservation stations 22. Each of opcode decode units 44A–44C forms an issue position with the corresponding second reservation station 22A–22C and functional unit 24A–24C. Instructions are passed from an opcode decode unit 44 to the corresponding second reservation station 22 and further to the corresponding functional unit 24.

Multiplexor 42A is included for selecting between the instructions provided by MROM unit 34 and by early decode unit 40A. During times in which MROM unit 34 is dispatching instructions, multiplexor 42A selects instructions provided by MROM unit 34. At other times, multiplexor 42A selects instructions provided by early decode unit 40A. Similarly, multiplexor 42B selects between instructions provided by MROM unit 34 and early decode unit 40B.

According to one embodiment employing the x86 instruction set, early decode units 40 perform the following operations:

(i) merge the prefix bytes of the instruction into an encoded prefix byte;
(ii) decode unconditional branch instructions (which may include the unconditional jump, the CALL, and the RETURN) which were not detected during branch prediction;
(iii) decode source and destination flags;
(iv) decode the source and destination operands which are register operands and generate operand size information;
(v) determine the displacement and/or immediate size so that displacement and immediate data may be routed to the corresponding opcode decode unit and address generation unit; and
(vi) determine constants by which the ESP and EBP registers are modified by the instruction for instructions which implicitly modify the ESP or EBP.

Opcode decode units 44 are configured to decode the opcode of the instruction, producing control values for functional unit 24. Immediate data is routed with the control values to second reservation stations 22. Displacement data is routed to first reservation stations 23 for use in generating a data address. Additionally, the selected segment register corresponding to the instruction is routed to first reservation stations 23.

Since early decode units 40 detect operands, the outputs of multiplexors 42 are routed to register file and reorder buffer 32. Operand values or tags may thereby be routed to first reservation stations 23 and second reservation stations 22. Additionally, memory operands are detected by early decode units 40. Therefore, the outputs of multiplexors 42 are routed to first reservation stations 23. Memory operations corresponding to instructions having memory operands are stored by first reservation stations 23. Still further, the constant value corresponding to the instruction being decoded is generated by early decode units 40. The constant values are forwarded to speculative register file 35.

Figure 3:
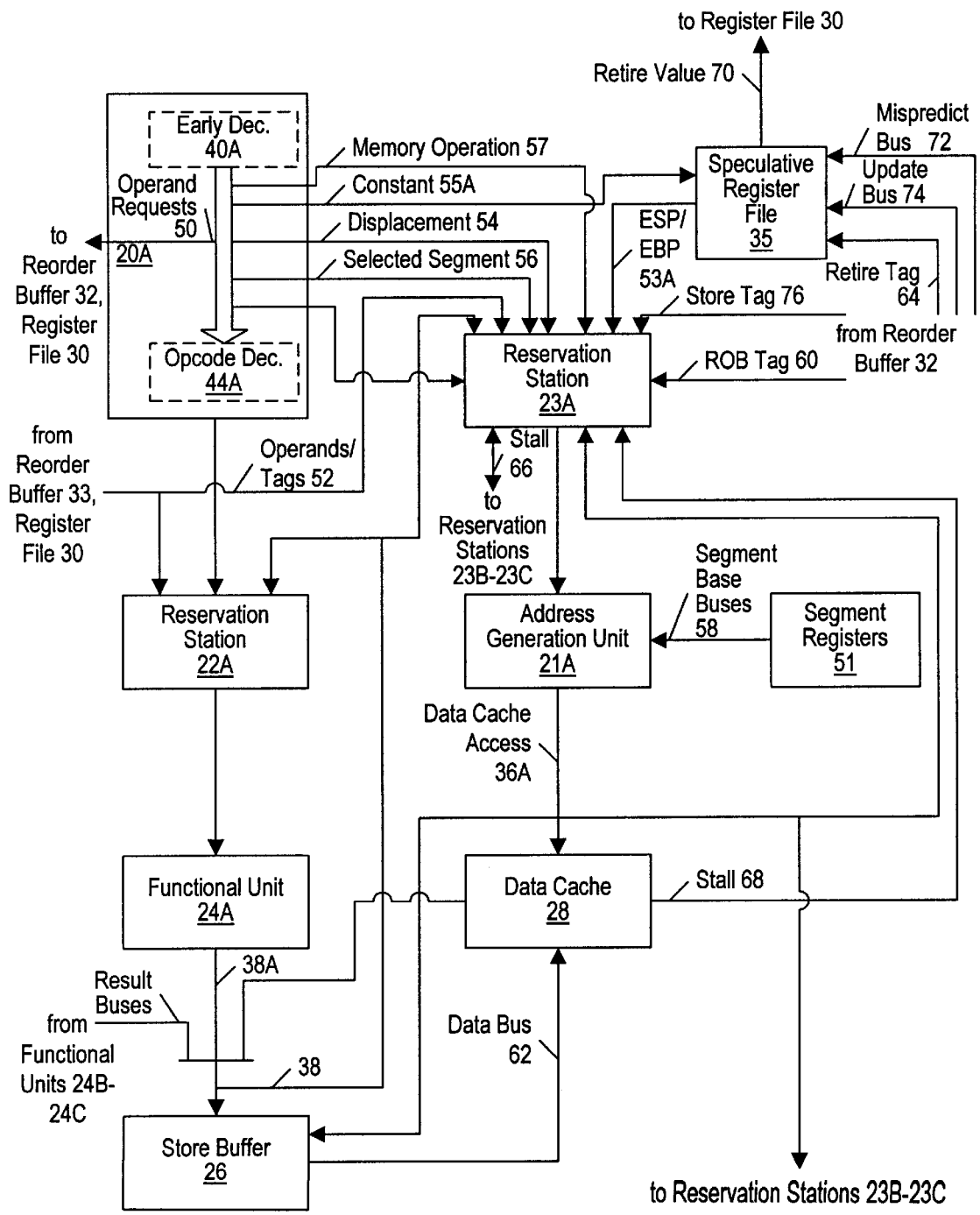
FIG. 3 is a block diagram of several units shown in FIG. 1, highlighting interconnections between the units according to one embodiment of the microprocessor.

Turning next to FIG. 3, a block diagram of decode unit 20A, first reservation station 23A, address generation unit 21A, second reservation station 22A, functional unit 24A, and store data buffer 26, data cache 28, speculative register file 35, and a segment register block 51 is shown. Interconnections between the blocks according to one embodiment of microprocessor 10 are highlighted in FIG. 3. Interconnections between decode units 20B–20C, first reservation stations 23B–23C, address generation units 21B–21C, reservation stations 22B–22C, functional units 24B–24C, store data buffer 26, data cache 28, and speculative register file 35 may be similar. Additional interconnections may be included between the blocks for other purposes.

Early decode unit 40A selects the register operands and displacement from the instruction conveyed thereto by instruction alignment unit 18. The register operands are requested from register operand storage 39 (comprising reorder buffer 32 and register file 30) by conveying indications of the registers upon a register operand bus 50. Additionally, register operands bus 50 is coupled to first reservation station 23A. First reservation station 23A may thereby determine the register operands employed by a particular instruction. In particular, first reservation station 23A may determine which register operands are address operands. Corresponding register operands (or reorder buffer tags to be captured from result buses 38) are conveyed upon operands/tags bus 52. Both first reservation station 23A and second reservation station 22A receive operands/tags bus 52 in order to capture the operands for the instruction. If the ESP or EBP registers are used as register operands for the instruction, the operands are selected from speculative register file 35. An ESP/EBP bus 53A is coupled between speculative register file and first reservation stations 23 and second reservation stations 22, upon which speculative ESP and EBP values are conveyed. The connection to first reservation station 23A is shown in FIG. 3.

When register operands, if any, are provided for each operand used to form the data address, first reservation station 23A conveys the memory operation to address generation unit 21A. Address generation unit 21A forms the data address and conveys the data address to data cache 28 upon data cache access bus 36A. Data cache access bus 36A is one of data cache access buses 36 shown in FIG. 1. In addition, the reorder buffer tag corresponding to the memory operation, the load/store nature of the operation, the selected segment corresponding to the memory operation, and the operand size are conveyed upon data cache access buses 36.

In order to form the data address, first reservation station 23A receives memory operation information from early decode unit 40A. The displacement corresponding to the instruction is conveyed upon a displacement bus 54. If the instruction does not include a displacement, a zero displacement value is conveyed by early decode unit 40A. Additionally, the selected segment register associated with the instruction is indicated upon selected segment bus 56 coupled between first reservation station 23A and early decode unit 40A. Address generation unit 21A uses the selected segment indication to select one of the segment base addresses provided by segment registers block 51 upon segment base bus 58. A segment base address is provided upon segment base bus 58 corresponding to each segment register employed by microprocessor 10. In embodiments of microprocessor 10 employing the x86 microprocessor architecture, six segment base addresses are conveyed corresponding to the six x86 segment registers (i.e. CS, SS, DS, ES, FS, and GS). It is noted that address generation units 21 may maintain duplicate copies of the segment registers instead of receiving the segment base addresses from segment registers block 51. Segment registers block 51 may be included within reorder buffer 32 or register file 30, for example.

A constant bus 55A is included for conveying the constant values to be added to the speculative ESP and EBP values stored in speculative register file 35. The ESP and EBP values resulting from the addition are indicative of their values during the execution of the instruction corresponding to the memory operation received by first reservation station 23A. These resulting ESP and EBP values are conveyed upon ESP/EBP bus 53A. Constant bus 55 is coupled between early decode unit 40A and speculative register file 35 for conveying the constant. Speculative register file 35 stores the constant from each early decode unit 40A–40C, for use in branch misprediction recovery as described below.

A memory operation bus 57 is included for conveying the load/store nature of the memory operation as well as the size of the memory operand. In one embodiment, memory operation bus 57 includes signals which may be asserted to indicate load, store, or load and store (for the case in which the memory operand is both a source and a destination of the instruction) memory operations are included within the instruction. Additionally, memory operation bus 57 includes signals for conveying the operand size in bytes.

The reorder buffer tag corresponding to the instruction is conveyed upon data cache access bus 36A such that store data buffer 26 may identify data to convey upon data bus 62 for store memory operations. Additionally, the reorder buffer tag is conveyed by data cache 28 upon the result buses 38 assigned to data cache 28. An ROB tag bus 60 from reorder buffer 32 conveys the tag assigned to the instruction to first reservation station 23A. The tag may arrive at first reservation station 23A concurrently with the displacement and selected segment information.

Data cache access bus 36A (as well other data cache access buses 36 from address generation units 21B–21C, not shown in FIG. 3) is coupled to reservation station 23A. Reservation station 23A performs dependency checking between the addresses conveyed upon data cache access buses 36 and the memory operations stored within reservation station 23A. Additionally, reservation station 23A stores the addresses conveyed upon data cache access bus 36A with the corresponding memory operations. In this manner, addresses are available for performing dependency checking. For example, store memory operations may not be performed to data cache 28 until the corresponding instruction is retired (as indicated by a store tag conveyed upon store tag bus 76 from reorder buffer 32). Memory operations performed between the generation of the store memory operation address and the performance of the store memory operation may be dependency-checked against the address. Prior to address generation for a store memory operation, all memory operations which are subsequent to the store memory operation in program order may be assumed to be dependent upon the store memory operation. Therefore, storing the addresses of store memory operations eliminates the stalling of subsequent memory accesses to different addresses. A stall bus 66 is coupled between first reservation stations 23. Stall bus 66 includes signals which may be asserted by each first reservation station 23A–23C to indicate that another reservation station 23A–23C should not complete the data cache access being performed by the corresponding address generation unit 21A–21C. Additionally, second reservation stations 22 receive stall bus 66 in order to detect that results being provided by data cache 28 are not valid. First reservation stations 23B–23C additionally receive data cache access buses 36 to similarly perform dependency checking.

Second reservation station 22A receives register operands or reorder buffer tags associated with the instruction upon operands/tag bus 52. Additionally, the decoded instruction including immediate and displacement data is conveyed from opcode decode unit 44A. Second reservation station 22A stores the instruction and operands until each operand has been provided. Result buses 38 (including result bus 38A from functional unit 24A) are coupled to first reservation station 23A and second reservation station 22A. The reservation stations scan the results provided upon result buses 38 by functional units 24 and data cache 28 for reorder buffer tags stored with respect to the instruction. When a result corresponding to the instruction is conveyed, either or both reservation stations 22A and 23A capture the result. First reservation station 23A stores and captures address operands, while second reservation station 22A stores and captures operands used by the instruction operation. Additionally, second reservation station 22A captures the result of a load memory access corresponding to the instruction. The result of the load memory access is the memory operand for the instruction. Second reservation station 22A receives and indication from opcode decode unit 44A that a memory operand is employed by the instruction, causing second reservation station 22A to await the memory operand before proceeding with execution of the instruction.

Address operands (other than the ESP and EBP) may be requested upon register operands bus 50 and received upon operands/tags bus 52 upon dedicated lines, while other dedicated lines provide operands used by the instruction operation. Alternatively, decode unit 20A may communicate which of the operands are address operands and which are for the instruction operation. Reservation stations 22A and 23A capture operands accordingly. The remaining operands used by the instruction are thereby provided. Upon receipt of the operands corresponding to the instruction, second reservation station 22A may select the instruction for execution by functional unit 24A.

When receiving an instruction which performs a store memory operation, functional unit 24A calculates the result of the instruction and forwards the result to store data buffer 26 upon result bus 38A. Additionally, functional unit 24A asserts an indication that the result is store data, such that store data buffer 26 captures the result. Store data buffer 26 stores the result and the reorder buffer tag identifying the corresponding store memory operation. When functional unit 24A receives an instruction which does not perform a store memory operation, the result is forwarded to register operand storage 39 upon result bus 38A. It is noted that store data buffer 26 receives result buses 38 from other functional units 24 in order to capture store data from those functional units as well. In this manner, store data buffer 26 may receive store data for each store memory operation. When the corresponding address is conveyed upon data cache access bus 36 and the conveyed load/store nature indicates store, then store data buffer 26 conveys the store data upon data bus 62 to data cache 28.

Data cache 28 receives data cache access buses 36 from each of address generation units 21. Data cache 28 is preferably capable of concurrently performing an access in response to a memory operation upon each of data cache access buses 36, and therefore includes one result bus 38 for each data cache access bus 36. Other embodiments of data cache 28 may be configured to concurrently perform fewer accesses than the number of data cache access buses 36. Such an embodiment may assert a stall signal upon stall bus 68 to indicate that a particular memory operation is not performed. One stall signal may be included upon stall bus 68 for each first reservation station 23A–23C. Upon receipt of an asserted stall signal, the receiving first reservation station 23A–23C attempts to perform the operation again during a subsequent clock cycle. Another embodiment of data cache 28 may be banked, such that multiple data accesses may be performed concurrently without multi-porting the storage within data cache 28. A portion of each cache line is stored within each bank. If a pair of data cache accesses access portions of cache lines which are stored in the same bank, then one of the accesses may not be completed. The stall signal is asserted for one of the pair of data cache accesses in this case.

Speculative register file 35 receives the retire tag upon retire tags bus 64. Speculative register file 35 stores the ESP and EBP values corresponding to the retire tag into register file 30. The ESP and EBP values are conveyed to register file 30 upon retire value bus 70. Additionally, speculative register file 35 discards speculative ESP/EBP values which are generated according to instructions which are subsequent to a mispredicted branch instruction. A mispredict bus 72 is coupled between speculative register file 35 and reorder buffer 32. Reorder buffer 32 conveys the reorder buffer tag corresponding to the mispredicted branch instruction upon mispredict bus 72. The ESP and EBP values corresponding to the plurality of concurrently decoded instructions including the mispredicted branch instruction is updated to indicate the value subsequent to executing the mispredicted branch instruction. The updated values are subsequently used to generate speculative ESP and EBP for instructions fetched from the corrected target address of the branch instruction. As used herein, the term "stall" refers to holding off subsequent instructions in a particular unit, such that the operations performed by the instruction within the particular unit are not completed.

Although many instructions modify the ESP or EBP by a constant value, certain infrequent instructions may modify the ESP and EBP by an unpredictable value. When a decode unit 20A–20C detects such an instruction, instructions subsequent to that instruction are stalled in decode units 20 until that instruction completes. The updated value for the ESP or EBP is subsequently transmitted to speculative register file 35 upon an update bus 74. When the update is received, decode units 20 release the stall. It is noted that, for cases in which the ESP or EBP is updated via increment or decrement by a constant value, speculative register file 35 generates the update internally. Updates via increment or decrement by a constant value are typically performed in response to instructions (e.g. PUSH or POP) which update the ESP or EBP implicitly. Conversely, update bus 74 is used for the infrequent instructions which update the ESP or EBP explicitly.

Figure 4:
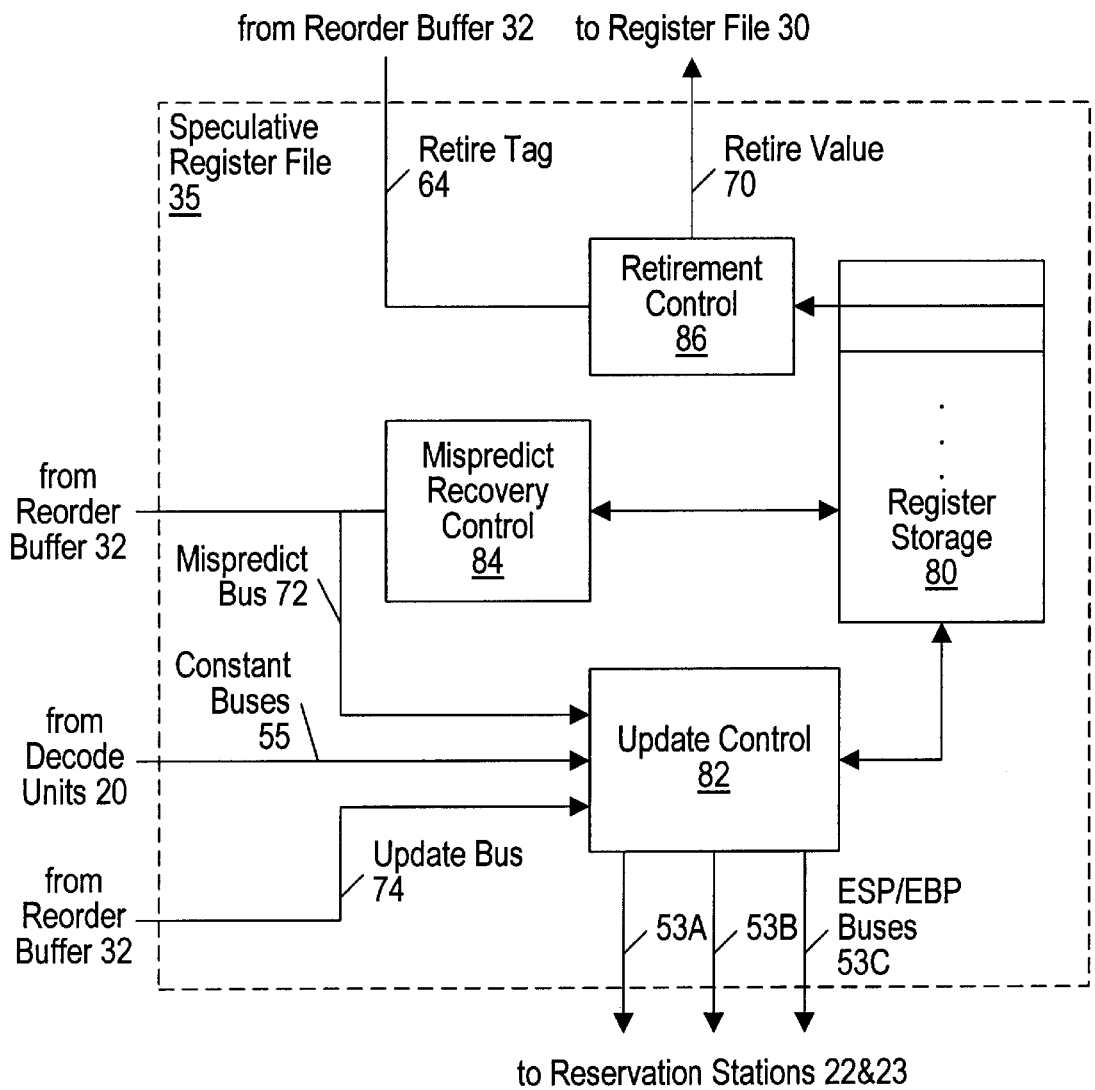
FIG. 4 is a block diagram of one embodiment of a speculative register file shown in FIGS. 1 and 3.

Turning next to FIG. 4, a block diagram of one embodiment of speculative register file 35 is shown. Included within speculative register file 35 is a register storage 80, an update control unit 82, a mispredict recovery control unit 84, and a retirement control unit 86. Update bus 74, a plurality of constant buses 55 (including constant bus 55A from decode unit 20A), mispredict bus 72, and ESP/EBP buses 53A, 53B, and 53C are coupled to update control unit 82. Mispredict bus 72 is coupled to mispredict recovery control unit 84. Retire tag bus 64 and retire value bus 70 are coupled to retirement control unit 86. Each of control units 82, 84, and 86 are coupled to register storage 80.

Register storage 80 includes a plurality of storage locations. Each storage location is configured to store a speculatively generated ESP and EBP register value. Additionally, each storage location may store constants indicative of the cumulative modification of the ESP and EBP registers subsequent to the execution of each instruction within the corresponding reorder buffer line. Indications of modification of the ESP and EBP by each instruction within the set of concurrently decoded instructions are conveyed upon constant buses 55. Update unit 84 may generate the cumulative constant values from the conveyed values. In one embodiment, the number of storage locations within register storage 80 is equal in number to the number of lines within reorder buffer 32. The storage location used to store the speculatively generated register values and the constants is a storage location identified by the reorder buffer line which stores the instructions associated therewith. It is noted that register storage 80 may be implemented as a plurality of registers or as an array, for example.

Update control unit 82 includes logic circuits configured to perform updates to register storage 80. During most clock cycles, update control unit 82 receives the indications upon constant buses 55 from decode units 20 and generates the cumulative constant values from the indications. The storage location within register storage 80 corresponding to the reorder buffer line within which the decoded instructions are stored is updated by update control unit 82 with the cumulative constant values. Additionally, the constant values associated with decode unit 20C are added to the speculative value of the ESP and EBP to generate the speculative value of the ESP and EBP for the subsequent set of concurrently decoded instructions. However, during clock cycles in which the ESP or EBP is being updated by a value that cannot be generated by decode units 20, an update is provided by reorder buffer 32 upon update bus 74. An exemplary update to the ESP which is generated by reorder buffer 32 is a move from another register into the ESP. The update value is provided by reorder buffer 32 upon execution of the corresponding instruction in functional units 24. Update control unit 82 receives the value and stores it within register storage 80 according to the line within reorder buffer 32 storing the instruction executed by functional units 24. As noted above, when an instruction is encountered by microprocessor 10 which updates the ESP or EBP in a manner which may not be generated by decode units 20, then the instructions subsequent to the encountered instruction are stalled within decode units 20. The instructions remain stalled until a functional unit 24 provides the value upon update bus 74. Therefore, updates are either received from decode units 20, from functional units 24, or from neither during a particular clock cycle.

Update control unit 82 generates ESP and EBP values for conveyance upon ESP/EBP buses 53 to each of first reservation stations 23A–23C and second reservation stations 22A–22C. ESP/EBP bus 53A is coupled to first reservation station 23A and second reservation station 22A. Similarly, ESP/EBP bus 53B is coupled to first reservation station 23B and second reservation station 22B, etc. ESP and EBP values corresponding to the instruction being decoded by decode unit 20A are conveyed upon ESP/EBP bus 53A, while ESP and EBP values corresponding to the instruction being decoded by decode unit 20B are conveyed upon ESP/EBP bus 53B, etc. In one embodiment, update control unit 82 generates a plurality of values from the speculative ESP and EBP values resulting from the set of concurrently decoded instructions decoded during the preceding clock cycle. Each possible constant which may result from a set of concurrently decoded instructions is added to the speculative values to generate the plurality of values. Values are subsequently selected from the plurality of values for conveyance upon ESP/EBP buses 53 in accordance with constants received upon constant buses 55.

Mispredict recovery control unit 84 is configured to update register storage 80 according to the detection of a mispredicted branch instruction. When an indication of a mispredicted branch is received upon mispredict bus 72, mispredict recovery control unit 84 accesses the storage location within register storage 80 indicated by the reorder buffer tag provided upon mispredict bus 72. The constants and ESP and EBP values stored within the indicated storage location are examined to determine corrective actions. For example, if the second instruction within a reorder buffer line is a mispredicted branch and the stored constants corresponding to the ESP are 4, 4, 0 (for decode units 20A, 20B, and 20C, respectively), then the stored ESP value is adjusted by adding four to the value. The ESP value associated with the branch instruction in the example is four greater than the original value prior to the execution of the instructions in the reorder buffer line, as indicated by the constant four in the second position. Therefore, the ESP value stored in the selected storage location (i.e. the value prior to execution of the concurrently decoded instructions) is four less than the value associated with the branch instruction. Generally speaking, the ESP value is adjusted by the constant associated with the decode unit 20 which decoded the mispredicted branch instruction. The adjusted value is stored in register storage 80 in a storage location contiguous to the storage location corresponding to the reorder buffer line storing the mispredicted branch instruction. In this manner, the adjusted value is available to the instructions fetched from the corrected path. It is noted that other exceptions may be handled similar to the mispredicted branch discussion.

Circuits within mispredict recovery control unit 84 perform the correction to the ESP and EBP values stored within the selected storage location and store the corrected value into the contiguous storage location. Additionally, update control unit 82 receives mispredict bus 72. Lines within reorder buffer 32 which are storing instructions subsequent to the mispredicted branch are discarded. Therefore, the values stored within respective storage locations within register storage 80 are also discarded. The storage location "contiguous" to a particular storage location is the storage location corresponding to the reorder buffer line which is allocated to instructions subsequent to the instructions corresponding to the particular storage location. For example, the storage location corresponding to reorder buffer line 0 is contiguous to the storage location corresponding to reorder buffer line 1. The values corresponding to the ESP and EBP register contents subsequent to execution of the instructions in reorder buffer line 0 is stored in the storage location corresponding to reorder buffer line 1.

Retirement control unit 86 is configured to transfer the ESP and EBP values from a storage location within register storage 80 indicated by a retire tag conveyed upon retire tag bus 64. The ESP and EBP values are conveyed by retirement control unit 86 upon retire value bus 70 to register file 30. Register file 30 stores the values into the location identified as the ESP and EBP registers. It is noted that the ESP and EBP registers within register file 30 are updated from speculative register file 35, not from reorder buffer 32 similar to other registers within register file 30. It is further noted that the value to be retired is stored in the storage location contiguous to the storage location indicated by the retire tag.

It is noted that, if reorder buffer 32 becomes empty, update control unit 82 continues to convey the last updated ESP and EBP values from register storage 80. Therefore, the ESP and EBP values are maintained in cases where the instruction processing pipeline becomes empty. It is further noted that, if a branch misprediction is detected during the same clock cycle as an update is conveyed upon update bus 74, the branch misprediction update may be performed in lieu of the other updates. Since the mispredicted branch instruction is prior to either of the other updates in program order and the instructions subsequent to the mispredicted branch instruction are discarded, then the updates these instructions generate may be discarded as well. It is further noted that retirement control unit 86, mispredict recovery control unit 84, and update control unit 82 may be combined into a single control unit, according to one embodiment.

Additional information regarding speculative register file 35 may be found in the commonly assigned, co-pending patent application entitled "A Reorder Buffer Including a Speculative Register File Configured to Store Line-Oriented Speculative Register States", Ser. No. 08/550,218, filed Oct. 30, 1995 by Tran, et al. and "A Speculative Register File for Storing Speculative Register States and Removing Dependencies Between Instructions Utilizing the Register", Ser. No. 08/549,961, filed Oct. 30, 1995 by Tran, et al. The referenced patent applications are incorporated herein by reference in their entirety.

Turning next to FIG. 4A an exemplary instruction sequence 90 is shown. Instruction sequence 90 is divided into three sets of concurrently decoded instructions which are stored in three reorder buffer lines. The first three instructions, including a POP instruction 92, comprise reorder buffer line 0. A PUSH instruction 94, a branch instruction 96, and a PUSH instruction 98 comprise reorder buffer line 1. Finally, a PUSH instruction 100, a PUSH instruction 102, and a third instruction comprise reorder buffer line 2. The instructions INS1, INS2, and INS3 represent random instructions which do not update the ESP or EBP registers. Additionally shown in FIG. 4A are initial values of the ESP and EBP (i.e. values prior to execution of instruction sequence 90). It is noted that PUSH instruction 98 and subsequent instructions reside in memory at the target address of branch instruction 96. Branch instruction 96 is predicted taken in the example. The branch instruction is later found to be mispredicted. It is further noted the ESP and EBP register files are shown in hexadecimal format in FIGS. 4A, 4B, and 4C.

Turning to FIG. 4B, the contents of register storage 80 subsequent to fetch and dispatch of instruction sequence 90 is shown. Storage location 0 corresponds to reorder buffer line 0, storage location 1 corresponds to reorder buffer line 1, etc. Storage location 0 stores the initial values of the ESP and EBP, since storage location 0 is storing the first line of instructions from instruction sequence 90. Additionally, storage location 0 stores the constants generated by speculative register file 35 upon receipt of indications from decode units 20. The constants are listed from left to right in the order of the instruction within the line. The constant on the left is associated with the first instruction in program order, the middle constant is associated with the second instruction in program order, and the constant on the right is associated with the third instruction in program order.

None of the instructions within instruction sequence 90 modify the EBP register. Therefore, the constants stored for the EBP register comprise zeros. However, instructions 92–102 modify the ESP register. POP instruction 92 within reorder buffer line 0 increments the ESP register by 4. Therefore, a constant of four is stored in the middle and right positions of the ESP constants for reorder buffer line 0. With respect to reorder buffer line 1, PUSH instruction 94 and PUSH instruction 98 both decrement the ESP register by 4. Therefore, a constant of −4 is stored in the left and middle positions of the ESP constants for reorder buffer line 1. Additionally, a constant of −8 is stored in the right position of the ESP constants for reorder buffer line 1 (the cumulative modification of PUSH instructions 94 and 98). Similarly, PUSH instructions 100 and 102 decrement the ESP by 4 each. The ESP constants for reorder buffer line 2 comprise −4, −8, and −8, respectively.

Since the EBP value is unmodified during execution of instruction sequence 90, the EBP value stored in each storage location of register storage 80 is equal to the initial EBP value. However, the ESP value is modified during execution of instruction sequence 90. Therefore, speculative values for the ESP prior to the execution of each set of concurrently decoded instructions (i.e. reorder buffer lines) are stored in the storage location of register storage 80 corresponding to that set of concurrently decoded instructions. The initial value of the ESP register is stored in storage location 0. Storage location 1 contains the value of the ESP register subsequent to execution of the instructions within reorder buffer line 0 (i.e. FFFFFF00+4=FFFFFF04). Similarly, storage location two includes the ESP value subsequent to the execution of the instructions within reorder buffer line 1 (i.e. FFFFFF04−8=FFFFFEFC). Finally, storage location three stores the ESP value subsequent to execution of the instructions within reorder buffer line 2 (i.e. FFFFFEFC−8=FFFFFEF4).

Turning now to FIG. 4C, storage locations of register storage 80 are depicted after branch instruction 96 is found to be mispredicted. The value stored in storage location 2 is updated to indicate the value of the ESP subsequent to execution of the branch instruction (i.e. prior to executing PUSH instruction 98). The value is generated by adding the value stored in storage location 1 (FFFFFF04) to the constant associated with the branch instruction (−4). Hence, the new speculative value of the ESP is FFFFFF00. This speculative value will be used for the instructions fetched in response to the branch misprediction. It is noted that these instructions will be stored into reorder buffer line 2, and therefore will correspond to storage location 2 in register storage 80.

Figure 5:
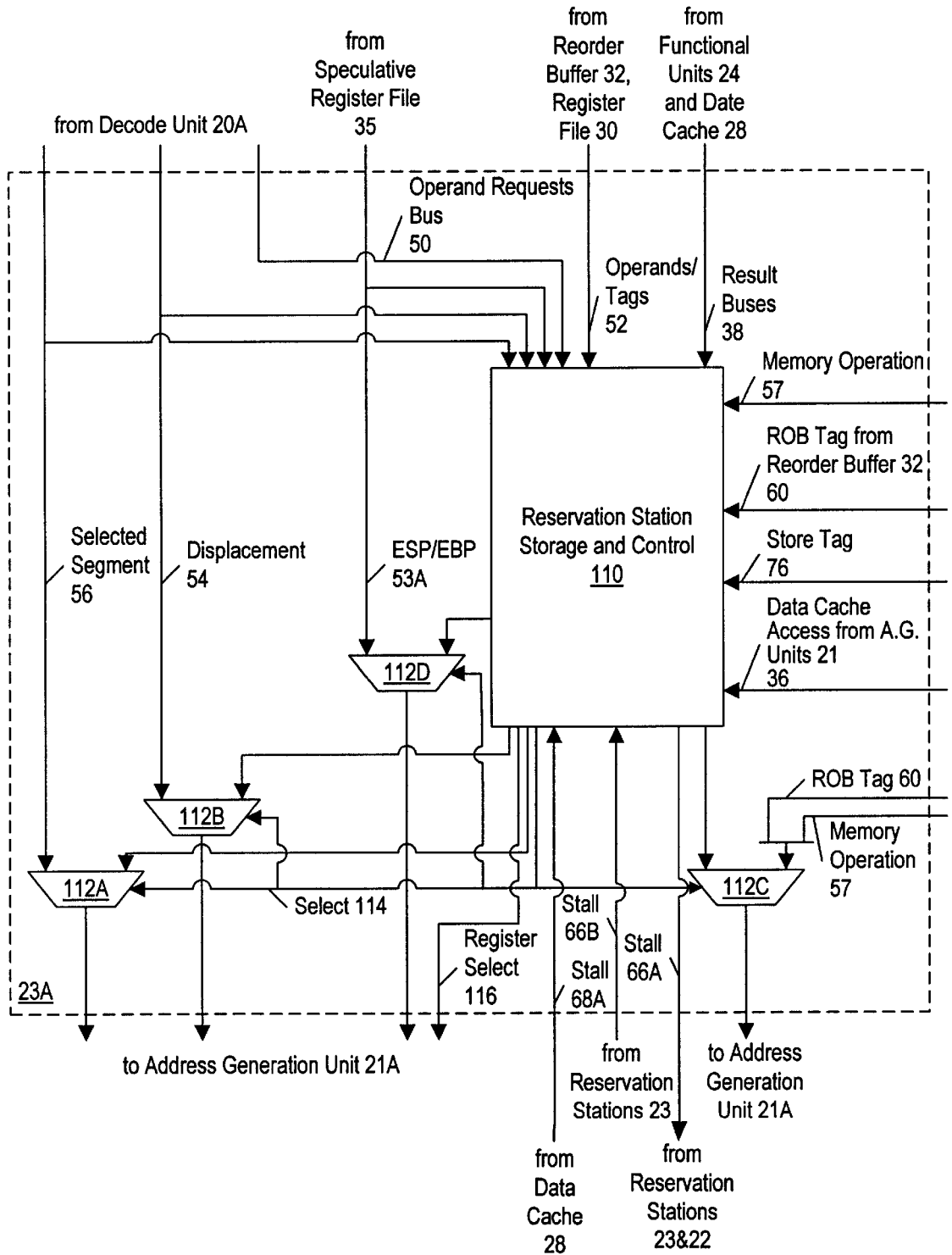
FIG. 5 is a block diagram of one embodiment of a memory reservation station shown in FIGS. 1 and 3, including a reservation station storage and control unit.

Turning now to FIG. 5, a block diagram of first reservation station 23A is shown. First reservation station 23A includes a reservation station storage and control unit 110 and a plurality of selection circuits 112A–112D. Selection circuits 112 select between memory operation information stored in reservation station storage and control unit 110 and memory operation information corresponding to a memory operation being conveyed to first reservation station 23A upon selected segment bus 56, displacement bus 54, memory operation bus 57, ROB tag bus 60, and ESP/EBP bus 53. A select line 114 is coupled as the selection control to selection circuits 112, provided by reservation station storage and control unit 110.

If reservation station storage and control unit 110 is storing a load memory operation which has received each of its operands, the memory operation information corresponding to that load memory operation is conveyed to selection circuits 112. Select line 114 is toggled such that selection circuits 112 select the memory operation information from reservation station storage and control unit 110. If reservation station storage and control unit 110 is not storing a load memory operation which has received each of its operands and a load memory operation is being conveyed to reservation station 23A from decode unit 20A, then selection line 114 is toggled to select the load memory operation being conveyed to reservation station 23A if the memory operation uses at most the ESP and EBP as register operands within the address operands. First reservation station 23A may determine which registers are used as address operands via operands request bus 50. If other register operands are employed or no load memory operation is conveyed during the clock cycle, then the memory operation is not selected via selection circuits 112. Instead, an invalid reorder buffer tag is sent to address generation unit 21A. In this manner, the data cache access upon data cache access bus 36A will be ignored.

A memory operation stored in reservation station storage and control unit 110 may employ any register as an address operand. Selection circuit 112D selects between ESP/EBP bus 53A (which conveys two register values) and an input from reservation station storage and control unit 110. Therefore, when register operands other than the ESP and EBP are used, the register operands may be conveyed through selection circuit 112D.

A register select bus 116 coupled between reservation station 23A and address generation unit 21A conveys an indication for each of the two register values transmitted by selection circuit 112D. The indication determines whether or not an address operand is conveyed via the corresponding register value. Address generation unit 21A determines which register operands to include in address generation from the indications conveyed upon register select bus 116. Reservation station storage and control unit 110 determines the state of the indications upon register select bus 116 via an examination of the address operands indicated upon operands request bus 50 for a memory operation being conveyed to reservation station storage and control unit 110 during a clock cycle in which the memory operation is concurrently selected through selection circuits 112. For memory operations being selected from within reservation station storage and control unit 110, the indications are generated depending upon whether zero, one, or two register operands are included within the address operands. If zero register operands are included, both indications indicate that the corresponding register values from selection circuit 112D are not used in the address calculation. If one register operand is included, then one of the indications indicates that the corresponding register value is used while the other indication indicates that its corresponding register value is not used. Similarly, both indications indicate that their corresponding register values are used if two register operands are included. The register operands are routed through selection circuit 112D accordingly.

Reservation station storage and control unit 110 additionally receives operands/tags bus 52 and result buses 38. If a register operand other than the ESP or EBP registers are address operands, then either an operand value or a reorder buffer tag is delivered upon operands/tags bus 52. If a reorder buffer tag is delivered, reservation station storage and control unit 110 monitors result buses 38 for the reorder buffer tag. When the reorder buffer tag is detected, the corresponding result from results buses 38 is captured and stored within reservation station storage and control unit 110. When the each of the address operands corresponding to a memory operation have been provided, then the memory operation may be conveyed to address generation unit 21A.

Memory operation bus 57 and ROB tag bus 60 are coupled to reservation station storage and control unit 110 as well. Between selected segment bus 56, displacement bus 54, ESP/EBP bus 53A, operands/tags bus 52, and result buses 38, the address operands and memory operation information for a memory operation are provided to reservation station storage and control unit 110. The address operands are used by address generation unit 21A to form the data address of the memory operation. Additional memory operation information (such as the reorder buffer tag, the load/store nature of the memory operation, the selected segment register, and the size of the memory operation) is conveyed to data cache 28 for performing the memory access. It is noted that a commonly used address calculation is the displacement added to the ESP or EBP. Therefore, adding the segment base, the displacement, and the ESP or EBP register values may yield a significant amount of the performance benefit.

Retire tag bus 76 is coupled to reservation station storage and control unit 110 for selecting store memory operations to be performed to data cache 28. While load memory operations are selected for performance when each of the operands have been provided, store memory operations are not performed in this embodiment until they are no longer speculative. Store memory operations change the memory location being accessed, and therefore the effects of the store memory operation are more difficult to discard than results stored into reorder buffer 32, for example. When a store memory operation is ready to be retired, reorder buffer 32 conveys the corresponding reorder buffer tag upon store tag bus 76. Reservation station storage and control unit 110 compares the reorder buffer tag conveyed upon store tag bus 76 to the reorder buffer tags of memory operations stored therein. If a match is found, the store memory operation is selected for conveyance to address generation unit 21A.

In one embodiment, address generation unit 21A employs a four input adder for adding the base, index, displacement, and segment base values. In another embodiment, the displacement and the segment base are added prior to receipt of the base and index operands. Therefore, address generation unit 21A may employ a 3 input adder for adding the displacement/segment base sum to the base and index operands.

It is noted that, in order to generate the address for the store memory operations, store memory operations may be selected for address generation prior to receiving the corresponding reorder buffer tag upon store tag bus 76. Reservation station storage and control unit 110 conveys the memory operation as a load memory operation, such that data cache 28 does not modify any memory locations in response to the access. Because no instructions are awaiting the store data, the reorder buffer tag of the store memory operation being forwarded upon result buses 38 is inconsequential (i.e. no units monitoring result buses 38 will attempt to capture the result). However, reservation station and control unit 110 may capture the address generated by address generation unit 21 and store the address with the store memory operation. Dependency checking may thereby be more accurate. As opposed to assuming a dependency if the store memory operation is prior to a load memory operation in program order, the load address (received upon data cache access buses 36) may be compared to the store address stored in reservation station and control unit 110. It is noted that the program order of a pair of accesses may be determined by comparing their respective reorder buffer tags.

Alternatively, the address used for a store memory operation may be captured by store buffer 26. Store buffer 26 may receive store tag bus 76 in order to perform the store memory operation to data cache 28 when the instruction corresponding to the store memory operation is retired. Additionally, store buffer 26 may perform dependency checking between load memory accesses performed by address generation units 21 and the store memory accesses stored therein.

Finally, data cache access buses 36 are coupled to reservation station storage and control unit 110. Reservation station storage and control unit 110 compares the addresses conveyed upon data cache access buses 36 to the addresses of memory operations stored within reservation station storage and control unit 110. A dependency is detected with respect to a memory operation if: (i) the memory operation is a load memory operation; (ii) a store memory operation is within reservation station storage and control unit 110 which is prior to the load memory operation in program order; and (iii) either the store memory operation modifies at least one byte accessed by the load memory operation or the store memory operation does not yet have a calculated address. If a dependency is detected, a stall signal upon stall bus 66A (part of stall bus 66) is asserted to the reservation station 23B–23C which is performing the load memory operation. Second reservation stations 22 and reorder buffer 32 additionally receive stall bus 66A in order to ignore the response conveyed by data cache 28 for the load memory operation. In addition to receiving stall bus 66A, reservation station 23A performs dependency checking of the address upon data cache access bus 36A. If a dependency is detected between the calculated address and another memory operation stored within reservation station storage and control unit 110, then the memory operation corresponding to the calculated address is stalled internally. A stall signal is sent upon stall bus 66A to second reservation stations 23A–23C to indicate that the corresponding memory operation is not complete, such that results of the corresponding memory operation are ignored. It is noted that in one embodiment, a stall signal is included upon stall bus 66A for each data cache access bus 36 (and therefore each result bus 38 assigned to data cache 28). Second reservation stations 23A–23C may thereby associate a stall signal with a particular result.

Similarly, a stall bus 66B (part of stall bus 66) is received by reservation station storage and control unit 110. If a stall signal is received upon stall bus 66B when address generation unit 21A is performing a memory operation, then reservation station storage and control unit 110 retains the memory operation to be performed again during a subsequent clock cycle. Stall line 68A (part of stall bus 68) is treated in an analogous fashion.

It is noted that, when a memory operation is performed to data cache 28 and hits data cache 28, then the memory operation is typically discarded by reservation station storage and control unit 110. Data cache hit/miss status is conveyed to reservation station 23A from data cache 28 (not shown). However, if a stall is signalled upon stall bus 66B or stall line 68A, then the memory operation is retained until performed successfully in a subsequent clock cycle. Similarly, if the memory operation is a miss in data cache 28, then the memory operation is retained within reservation station storage and control unit 110 until the memory operation becomes non-speculative (as indicated by the corresponding reorder buffer tag being conveyed upon store tag bus 76). The memory operation may then be conveyed to data cache 28. The corresponding data may be fetched from the main memory subsystem (in the case of a load miss), or conveyed to the main memory subsystem (in the case of a store miss). Alternatively, data may be fetched from the main memory subsystem for stores as well. The store memory operation may then complete by storing the data from store buffer 26 into the cache line storing the newly fetched data.

As used herein, a selection circuit is a circuit configured to select an output from at least two inputs according to a selection control signal conveyed thereto. A selection circuit may comprise one or more multiplexor circuits coupled in parallel or cascaded fashion to perform the selection.

Figure 6:
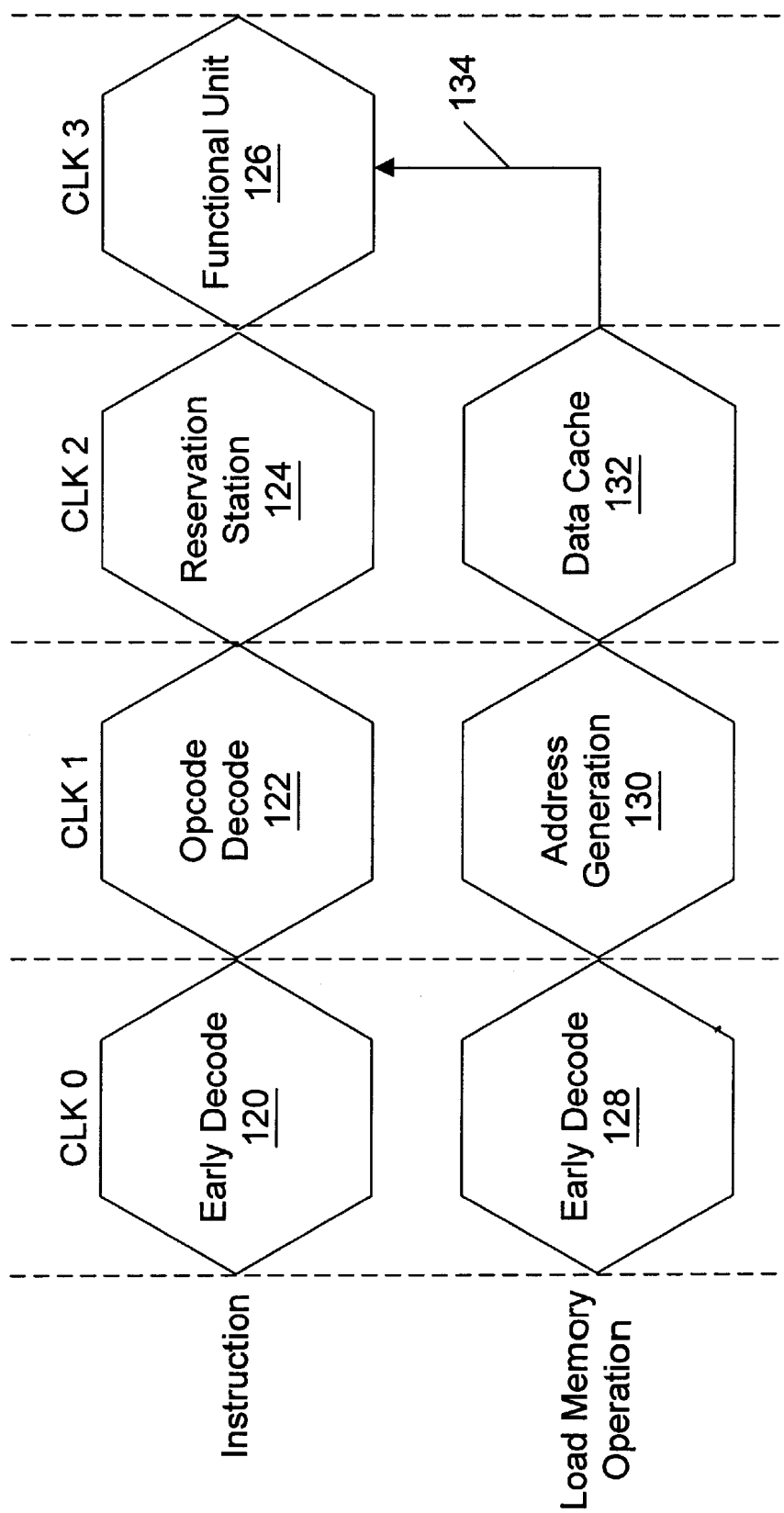
FIG. 6 is a timing diagram corresponding to an instruction having a memory operand, wherein the instruction is executed by the microprocessor shown in FIG. 1.

Turning now to FIG. 6, a timing diagram illustrating an instruction including a load memory operation is shown. The instruction flows through early decode unit 40A, opcode decode unit 40B, second reservation station 22A, and functional unit 24A during clock cycles CLK0, CLK1, CLK2, and CLK3, respectively. The instruction flow is shown as blocks 120, 122, 124, and 126 in FIG. 6. Similarly, the load memory operation flows through early decode unit 40A (concurrently with the instruction), address generation unit 21A (after being immediately forwarded through first reservation station 23A), and data cache 28 during clock cycles CLK0, CLK1, and CLK2, respectively. The load memory operation flow is shown as blocks 128, 130, and 132 in FIG. 6.

The load memory operation uses as address operands at most the displacement, the segment base address, and the ESP and/or EBP register values. The displacement and selected segment register are detected by early decode unit 40A and conveyed to first reservation station 23A. The address operands which are registers are conveyed as well, and first reservation station 23A detects that the ESP and/or EBP are used as address operands. Therefore, the load memory operation is selected through first reservation station 23A to address generation unit 21A (via selection circuits 112). During clock cycle CLK1, address generation unit 21A generates the data address corresponding to the load memory operation. Data cache 28 is subsequently accessed (clock cycle CLK2). As data cache 28 is accessed, the reorder buffer tag corresponding to the load memory operation (and the instruction) is conveyed upon result buses 38. Reservation station 22A detects the reorder buffer tag and selects the corresponding instruction for execution (assuming the other operands of the instruction have been provided). The instruction is sent to the functional unit, and the data from data cache 28 is routed to the functional unit near the end of clock cycle CLK2 (logically shown as arrow 134). Advantageously, the instruction is not held for multiple cycles in reservation station 22A awaiting data from the load memory operation. Instead, the data is provided such that the instruction flows unimpeded through the instruction processing pipeline of microprocessor 10.

FIG. 6 further illustrates that memory operands are provided by the present apparatus during the clock cycle that the instruction arrives within a second reservation station 22A–22C. Similarly, register operands are provided during the clock cycle the instruction arrives within second reservation station 22A–22C (i.e. clock cycle CLK2) Therefore, the penalty that formerly existed for an instruction that uses memory operands is eliminated for those memory operations which may be immediately forwarded through first reservation stations 23 to address generation units 21 during clock cycle CLK1. In other words, memory operands may be provided during the same clock cycle as register operands. Performance may be increased to the extent that memory operands may be provided as shown in FIG. 6. For microprocessor architectures which rely heavily upon memory operands (such as the x86 microprocessor architecture, for example), the performance impact may be substantial.

Figure 7:
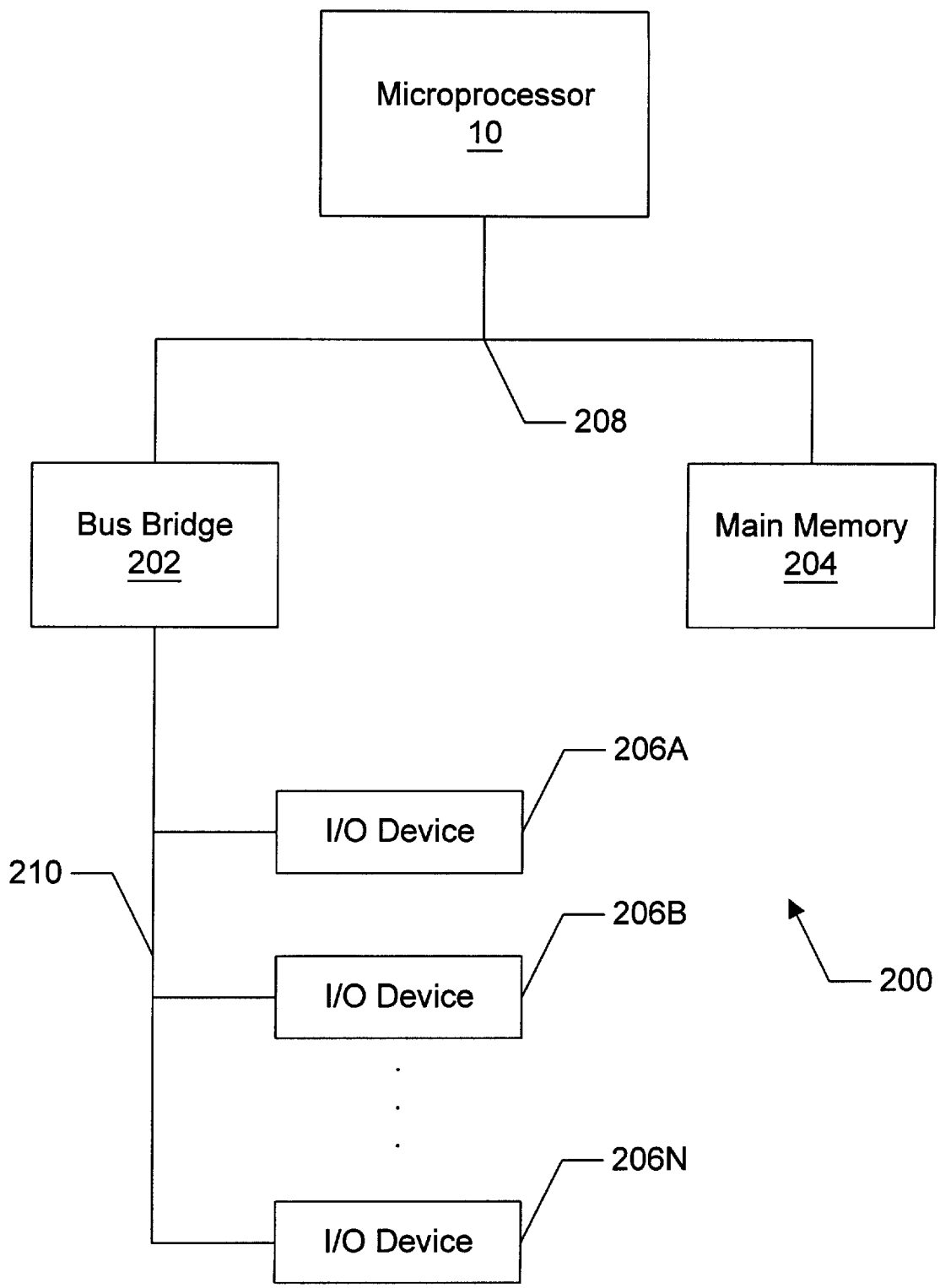
FIG. 7 is a block diagram of a computer system including the microprocessor shown in FIG. 1.

Turning now to FIG. 7, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/ output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 7 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration.

It is further noted that the x86 microprocessor architecture, including its segmentation mechanism, have been used herein as a specific example. However, any microprocessor architecture employing a mechanism whereby a logical address formed from the operands of an instruction is added to a value generated by an address translation mechanism to produce a translated address may benefit from the present invention. Such embodiments are contemplated, and are intended to be within the spirit and scope of the present invention as defined in the appended claims. Still further, the benefits of performing data accesses in parallel with decode and register operand fetch such that memory operands are available to an instruction at substantially the same time as register operands are not limited to the x86 microprocessor architecture. Conversely, the apparatus described herein is believed to be useful for any microprocessor architecture in which a register value may be calculated prior to executing an instruction which forms the register value. That register value may be subsequently used as an address operand and thereby benefit from the speculative generation of the register value by allowing the data cache access to begin early in the instruction processing pipeline.

It is additionally noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a it, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 1 below indicates fast path, double dispatch, and MROM instructions for one embodiment of microprocessor 10 employing the x86 instruction set:

TABLE 1

| x86 Fast Path, Double Dispatch, and MROM Instructions | |
|---|---|
| x86 Instruction | Instruction Category |
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | double dispatch |
| IN | MROM |
| INC | fast path |
| INS | MROM |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | double dispatch |
| JECXZ | double dispatch |
| JMF | fast path |
| LAHF | fast path |
| LAR | MROM |
| LDS | MROM |
| LES | MROM |

TABLE 1-continued x86 Fast Path, Double Dispatch, and MROM Instructions

| x86 Instruction | Instruction Category |
| --- | --- |
| LFS | MROM |
| LGS | MROM |
| LSS | MROM |
| LEA | fast path |
| LEAVE | double dispatch |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | double dispatch |
| LOOPcond | MROM |
| LSL | MROM |
| LTR | MROM |
| MOV | fast path |
| MOVCC | fast path |
| MOV CR | MROM |
| MOV DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPF | MROM |
| POPFD | MROM |
| PUSH | double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |
| RSM | MROM |
| SAHF | fast path |
| SAL | fast path |
| SAR | fast path |
| SHL | fast path |
| SHR | fast path |
| SBB | fast path |
| SCAS | MROM |
| SCASB | MROM |
| SCASW | MROM |
| SCASD | MROM |
| SETcc | fast path |
| SGDT | MROM |
| SIDT | MROM |
| SHLD | MROM |
| SHRD | MROM |

TABLE 1-continued x86 Fast Path, Double Dispatch, and MROM Instructions

| x86 Instruction | Instruction Category |
| --- | --- |
| SLDT | MROM |
| SMSW | MROM |
| STC | fast path |
| STD | fast path |
| STI | MROM |
| STCS | MROM |
| STOSB | MROM |
| STCSW | MROM |
| STOSD | MROM |
| STR | MROM |
| SUB | fast path |
| TEST | fast path |
| VERR | MROM |
| VERW | MROM |
| WBINVD | MROM |
| WRMSR | MROM |
| XADD | MROM |
| XCHG | MROM |
| XLAT | fast path |
| XLATB | fast path |
| XCR | fast path |

Note: instructions including an SIB byte are also considered fast path instructions.

It is noted that a superscalar microprocessor in accordance with the foregoing may further employ the latching structures as disclosed within the co-pending, commonly assigned patent application entitled "Conditional Latching Mechanism and Pipelined Microprocessor Employing the Same", Ser. No. 08/400,608 filed Mar. 8, 1995, by Pflum et al. The disclosure of this patent application is incorporated herein by reference in its entirety.

It is further noted that aspects regarding array circuitry may be found in the co-pending, commonly assigned patent application entitled "High Performance Ram Array Circuit Employing Self-Time Clock Generator for Enabling Array Access", Ser. No. 08/473,103 filed Jun. 7, 1995 by Tran. The disclosure of this patent application is incorporated herein by reference in its entirety.

It is additionally noted that other aspects regarding superscalar microprocessors may be found in the following co-pending, commonly assigned patent applications: "inearly Addressable Microprocessor Cache", Ser. No. 08/146,381, filed Oct. 29, 1993 by Witt; "Superscalar Microprocessor Including a High Performance Instruction Alignment Unit", Ser. No. 08/377,843, filed Jan. 25, 1995 by Witt, et al; "A Way Prediction Structure", Ser. No. 08/522,181, filed Aug. 31, 1995 by Roberts, et al; "A Data Cache Capable of Performing Store Accesses in a Single Clock Cycle", Ser. No. 08/521,627, filed Aug. 31, 1995 by Witt, et al; "A Parallel and Scalable Instruction Scanning Unit", Ser. No. 08/475,400, filed Jun. 7, 1995 by Narayan; and "An Apparatus and Method for Aligning Variable-Byte Length Instructions to a Plurality of Issue Positions", Ser. No. 08/582,473, filed Jan. 2, 1996 by Narayan, et al. The disclosure of these patent applications are incorporated herein by reference in their entirety.

In accordance with the above disclosure, a microprocessor has been described which performs memory operations in a plurality of address generation units and reservation stations. The reservation stations receive memory operation information from decode units and a speculative register file. If the memory operation has address operands including at most a displacement, a segment register, and one or more registers stored in a speculative register file within the microprocessor, then the memory operation may be performed while the instruction corresponding to the memory operation completes decode and transfers to a second reservation station coupled to a functional unit. The data may be provided to the instruction during the cycle that the instruction arrives in the second reservation station. Advantageously, the instruction may execute in substantially the same amount of time as an instruction having only register operands. Performance may be increased due to the reduced time required to execute instructions having memory operands.

Numerous variations and modifications will become apparent to those skilled in the art once the above disclosure is fully appreciated. It is intended that the following claims be interpreted to embrace all such variations and modifications.

What is claimed is:

1. A method for accessing memory operands in a microprocessor, comprising:

decoding an instruction to determine said instruction's memory operand and register operands during a first clock cycle, said memory operand being a data operand to be operated upon during execution of said instruction;

decoding said instruction's opcode and generating an address for said memory operand during a second clock cycle;

dispatching said decoded instruction's opcode and corresponding register operands to a reservation station and accessing a data cache to read the data associated with said address during a third clock cycle; and providing said decoded instruction and said data to a functional unit during a fourth clock cycle.

2. The method for accessing memory operands in a microprocessor as recited in claim 1, further comprising checking a speculative register file for data associated with said register operands.

3. A microprocessor comprising:

an early decode unit configured to determine an instruction's memory and register operands during a first clock cycle;

an opcode decode unit coupled to said early decode unit, wherein said opcode decode unit is configured to decode said instruction's opcode during a second clock cycle;

an address generation unit coupled to said early decode unit, wherein said address generation unit is configured to generate an address for said memory operand during said second clock cycle, wherein said memory operation comprises a data operand to be operated upon during execution of said instruction;

a reservation station coupled to said opcode decode unit, wherein said reservation station is configured to receive said opcode and said register operands during a third clock cycle;

a data cache coupled to said address generation unit, wherein said data cache is configured to output data associated with said address during said third clock cycle; and a functional unit coupled to said reservation station and said data cache, wherein said functional unit is configured to receive said output data, said opcode, and said register operands during a fourth clock cycle, and wherein said functional unit is configured to operate upon said output data responsive to said opcode.

4. The microprocessor as recited in claim 3 further comprising a second reservation station coupled to said opcode decode unit and said early decode unit and a second address generation unit coupled to said second reservation station, wherein said second reservation station is coupled to receive said address from said address generation unit and a second address from said second address generation unit, and wherein said second reservation station is configured to store a plurality of memory operands.

5. The microprocessor as recited in claim 4 wherein said second reservation station is configured to perform dependency checking between said address and said plurality of memory operands, and wherein said second reservation station is configured to perform dependency checking between said second address and said plurality of memory operands.

6. The microprocessor as recited in claim 5 wherein said second reservation station is configured to stall providing data corresponding to said address if a dependency is detected between said address and one of said plurality of memory operands.

7. The microprocessor as recited in claim 5 wherein said second reservation station is configured to stall providing data corresponding to said second address if a dependency is detected between said second address and one of said plurality of memory operands.

8. A computer system comprising:

a microprocessor including:

an early decode unit configured to determine an instruction's memory and register operands during a first clock cycle;

an opcode decode unit coupled to said early decode unit, wherein said opcode decode unit is configured to decode said instruction's opcode during a second clock cycle;

an address generation unit coupled to said early decode unit, wherein said address generation unit is configured to generate an address for said memory operand during said second clock cycle, wherein said memory operation comprises a data operand to be operated upon during execution of said instruction;

a reservation station coupled to said opcode decode unit, wherein said reservation station is configured to receive said opcode and said register operands during a third clock cycle;

a data cache coupled to said address generation unit, wherein said data cache is configured to output data associated with said address during said third clock cycle; and a functional unit coupled to said reservation station and said data cache, wherein said functional unit is configured to receive said output data, said opcode, and said register operands during a fourth clock cycle, and wherein said functional unit is configured to operate upon said output data responsive to said opcode; and an input/output (I/O) device coupled to said microprocessor and to another computer system, wherein said I/O device is configured to communicate between said microprocessor and said another computer system.

9. The computer system as recited in claim 8 wherein said I/O device comprises a modem.

10. The computer system as recited in claim 8 further comprising a main memory system coupled to said microprocessor.

11. The computer system as recited in claim 10 wherein said data cache is configured to stall said address if said data cache determines that said data corresponding to said address is not provided when said address is received by said data cache.

12. The computer system as recited in claim 10 wherein said data cache is configured to detect a miss of said data corresponding to said address within said data cache.

13. The computer system as recited in claim 12 wherein said reservation station is configured to retain said address until said instruction is non-speculative.

14. The computer system as recited in claim 13 wherein said reservation station is configured to convey said address to said data cache upon said instruction becoming non-speculative.

15. The computer system as recited in claim 14 wherein said microprocessor is configured to fetch said data from said main memory system and to store said data into said data cache.

16. The computer system as recited in claim 10 wherein said microprocessor is configured to fetch said data from said main memory system and to store said data into said data cache.

* * * * *